United States Patent
Sugimoto

(10) Patent No.: US 6,195,708 B1
(45) Date of Patent: *Feb. 27, 2001

(54) COMPUTER SYSTEM WHERE GIVING AND RECEIVING A DATA BETWEEN PROGRAMS ARE CONTROLLED

(75) Inventor: Masahiko Sugimoto, Shizuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,233

(22) Filed: Sep. 30, 1997

Related U.S. Application Data

(63) Continuation of application No. 08/297,923, filed on Aug. 31, 1994, now abandoned.

(30) Foreign Application Priority Data

Sep. 1, 1993 (JP) .................................................. 5-217474

(51) Int. Cl.⁷ ...................................................... G06F 9/00
(52) U.S. Cl. .............................................................. 709/310
(58) Field of Search ..................................... 395/680–683; 709/300, 301, 302, 303, 310–332

(56) References Cited

U.S. PATENT DOCUMENTS

| | | | |
|---|---|---|---|
| 4,914,586 | * | 4/1990 | Swinerhart et al. ................ 707/101 |
| 4,956,809 | * | 9/1990 | George et al. ....................... 707/101 |
| 4,980,842 | * | 12/1990 | Kamada et al. ..................... 395/310 |
| 5,301,268 | * | 4/1994 | Takeda ................................. 709/329 |
| 5,339,430 | * | 8/1994 | Lundin ................................. 709/332 |
| 5,379,376 | * | 1/1995 | Bednowitz ........................... 345/501 |
| 5,386,564 | * | 1/1995 | Shearer et al. ....................... 707/101 |
| 5,392,390 | * | 2/1995 | Crozier ................................ 210/650 |
| 5,404,442 | * | 4/1995 | Foster et al. ......................... 345/348 |
| 5,421,015 | * | 5/1995 | Khoyi et al. ......................... 709/107 |
| 5,553,281 | * | 9/1996 | Brown et al. ........................ 707/104 |
| 5,579,521 | * | 11/1996 | Shearer et al. ...................... 709/300 |
| 5,625,804 | * | 4/1997 | Cooper et al. .................. 395/500.47 |
| 5,666,553 | * | 9/1997 | Crozier ............................... 707/540 |
| 5,701,423 | * | 12/1997 | Crozier ............................... 345/335 |
| 5,848,415 | * | 12/1998 | Guck .................................... 707/10 |

* cited by examiner

Primary Examiner—Alvin E. Oberley
Assistant Examiner—St. John Courtenay, III
(74) Attorney, Agent, or Firm—Armstrong, Westerman, Hattori, McLeland & Naughton

(57) ABSTRACT

A computer system which operates by means of a plurality of programs and which controls the giving and receiving of data between programs in memory, the computer system including: a data storage area for storage of data which includes data having differing data formats, such as numeric data or character strings; and a data driver which controls the giving and receiving of data between the plurality of programs and the data storage area, wherein in the case in which data is to be passed from a first program to a second program of the plurality of programs, the data driver storing data from the first program into the data storage area, and in accessing the stored data, converting it to a format specified by the second program and passing the data to the second program. In this configuration, it is possible to give and receive data between programs without either considering the differences between systems or platforms, or having to change the common interface between programs. Thus, it is possible to have and utilize free-format data between various systems and platforms.

4 Claims, 5 Drawing Sheets

| | SYSTEM A | | | SYSTEM B | | |
|---|---|---|---|---|---|---|
| ORDER | SORT | SYSTEM VALUE | ORDER | SORT | SYSTEM VALUE |
| 1 | ▦ | 1 | 1 | ▦ | 2 |
| 2 | ▤ | 2 | 2 | ▤ | 1 |
| 3 | ▨ | 3 | 3 | ▨ | 4 |
| 4 | ▧ | 4 | 4 | ▧ | 3 |

Fig.5b SYSTEM A

KEYWORD           : HATCH
NUMBER OF ARRAY   : 4
DATA TYPE         : INT (INTEGER)
DATA VALUE        : | 1 | 2 | 3 | 4 |

Fig.5c SYSTEM B

KEYWORD           : HATCH
NUMBER OF ARRAY   : 4
DATA TYPE         : INT (INTEGER)
DATA VALUE        : | 2 | 1 | 4 | 3 |

COMPUTER SYSTEM WHERE GIVING AND RECEIVING A DATA BETWEEN PROGRAMS ARE CONTROLLED

This application is a continuation of application Ser. No. 08/297,923 filed Aug. 31, 1994 now abandoned.

BACKGROUND OF THE INVENTION

1. Field of the Invention

The present invention relates to a computer system which operates in accordance with a plurality of programs, and more specifically to technology for controlling the giving and receiving of data in memory between such programs.

2. Description of the Related Art

In recent years, accompanying the opening up of computer systems, programs have been used which have the same functions in a variety of systems and a variety of platforms. The giving and receiving of data between programs is generally done by passing parameters. These parameters are passed from top to bottom between programs in a hierarchic structure. Data thus passed includes information which is system specific and information which is platform specific. For that reason, depending upon the system or the platform, data is included that is not absolutely necessary. That is, there are cases in which programs irrelevant to the passed data are involved in the propagation of the data. To prevent this situation, it is desirable to perform efficient giving and receiving of data between programs.

In the past, the method of passing data as parameters and the method of using a common area for use of a control table were known methods of giving and receiving data between programs.

In the method of passing data from top to bottom using parameters, for example in the case in which data is passed from program A to program C in a hierarchic structure of programs A to C, there are systems in which there will exist data not required at program B. In this type of situation, with methods of the past, the data to be passed from program A to program C must needlessly be passed via program B.

In contrast to this, in the method of using a control table, data giving and receiving is performed by using a common area which can be accessed by the related group of programs. When the data attributes and table format changes, it is necessary in this method to change the related programs (that is, to re-code them). Also, in cases in which a given data is expressed as a numerical value in one system but as a character string in another system, it is necessary to either use different control tables for the different systems, or to establish a memory area for the storage of each of he differing format data.

In the above-described method of passing data using parameters, if we consider the case in which, for example, data is to be passed from program A via program B to program C, program B, which is unrelated to the programs involved in the data exchange, must be involved in the propagation of the data, this causing a change in the program B interface, this subsequently requiring changes in programs related to program B. Essentially, arising from the involvement in the propagation of data of a program not required for the propagation of the data, there is the problem of having to change the common interfaces between programs.

In the method which uses a control table for the giving and receiving of data, the problem exist of, if the format of the control table changes, having to change all of the related programs, and in the case in which a given data has different formats in different systems, the problem exists having either to use a different control table between different systems, or to establish an area for the storage of each of data formats. In addition, when the hierarchic depth of the control table becomes great, a problem exists in that it becomes difficult to identify the location at which the desired information is stored, this subsequently increasing the time required to retrieve the information.

In such system as these of the past, in giving and receiving data between programs, there remained the problem of there being no means of providing a common interface between systems and between platforms which passes data without showing the data which is either system specific or platform specific, for use as a common interface between systems or platforms.

SUMMARY OF THE INVENTION

An object of the present invention is to provide a computer system which enables the giving and receiving of data between programs without having to consider the differences between systems and without having to change the common interface between programs, thereby enabling the free use of data in free format between systems and between platforms.

To achieve the above-described object, the present invention provides a computer system which operates by means of a plurality of programs and which controls the giving and receiving of data between programs in memory, and which has an area for storage of data which includes data having differing data formats, such as numeric data or character strings and a data driver which controls the giving and receiving of data between the plurality of programs and the data storage area, in the case in which data is to be passed from a first program to a second program of the above-noted plurality of programs, the above-noted data driver storing data from the first program into the above-noted data storage area, and in accessing this stored data, converting it to a format specified by the second program and passing the data to the second program.

In the present invention, the control of giving and receiving of data is performed so that programs unrelated to the propagation of data being passed do not get involved in the propagation of data, so that the programs involved pass the data directly.

Therefore, it is possible to perform giving and receiving of system-specific or platform-specific data between differing systems or between differing platforms without changing the common interface between the programs, and without having to provide a specific areas in the control table as was required by methods of the past. It is also possible to have and use free-format data between differing systems and different platforms. In addition, it is possible to development programs that are not either system or platform specific.

BRIEF DESCRIPTION OF THE DRAWINGS

The other objects and characteristics of the present invention will be explained in detail using the preferred embodiments given below, making references to the drawings, which are as follows.

FIGS. 5a to 5d are drawings which explain a specific example of the graph creating processing of the system of FIG. 2.

DESCRIPTION OF THE PREFERRED EMBODIMENTS

Figure 1:
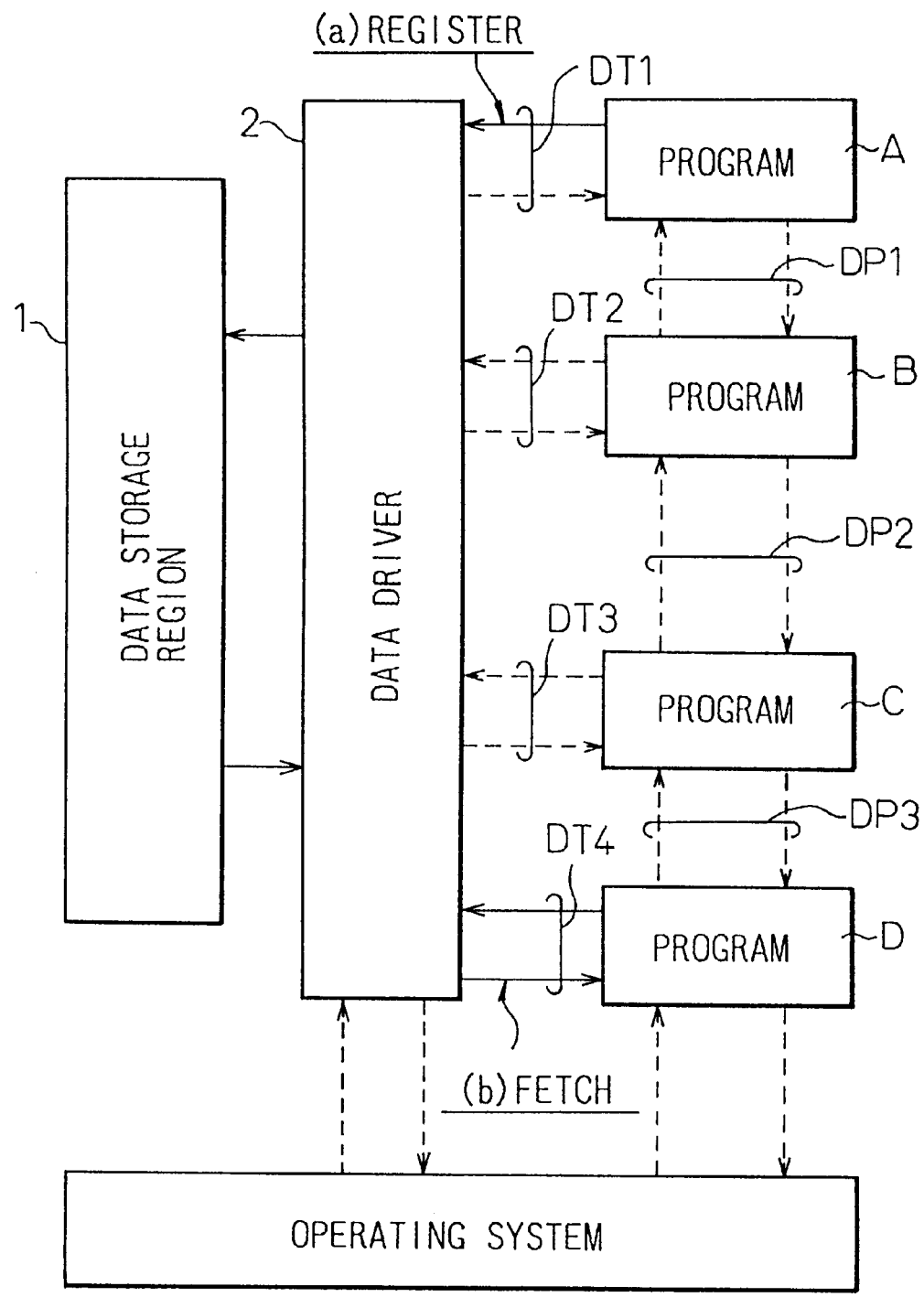
FIG. 1 is a block diagram which shows the basic configuration of a computer system according to the present invention which performs control of the giving and receiving of data between programs.

FIG. 1 is the basic configuration of a computer system according to the present invention for controlling the giving and receiving of data between programs.

In the configuration shown in this drawing, the example is that of a method of controlling the giving and receiving of data between programs of a computer system which operates in accordance with a plurality of computer programs (for the sake of simplicity, only the four programs A to D are shown in the drawing). In this drawing, 1 is a data storage area, into which is stored data which includes data having differing formats, such as numeric or character string, and 2 is a data driver which controls the giving and receiving of data between each of the programs A to D and the data storage area 1.

In the case in which data is to be passed from the 1st program A to the 2nd program D, the data from the 1st program A is first stored in to the data storage area 1 via the data driver 2 (refer to the arrow (a)). Next, when retrieving the data thus stored for the 2nd program D in the format specified by this program D, the data format is converted to that format and received by program D (refer to the arrow (b)).

As will be described later, in a preferred embodiment of the present invention in storing data from the 1st program A via the data driver 2 into the data storage area 1, this data is processed to include keywords, the data format, the data array size, and the data value.

In accordance with the configuration shown in FIG. 1, giving and receiving of information is performed between each of the programs A through D via the data paths DT1 through DT4 and the data storage area 1, by means of the data driver 2, with data paths DP1 to DP3 being used for the giving and receiving of data required only between programs A–B, programs B–C, and programs C–D (parameter data).

Therefore, in the case, for example, in which system-specific information is required at program D, because the data can be retrieved using data paths DT1 and DT4 and the data driver 2, it is not necessary to change the data paths DP1 to DP3 between programs (that is, the common interface between programs).

Also, because the giving and receiving of data between each program is controlled via the data driver 2, it is possible for differences in systems or platforms to be absorbed by data driver 2, it becoming unnecessary for each of programs A to D to consider the system or platform.

In addition, because data driver 2 converts the data to the format specified by the data destination (program D in the example shown in the drawing), even if the format of the data stored by program A changes, for example from numeric to character string, the same information will always be received by program D from data driver 2.

Next, a preferred embodiment of the present invention will be explained, with reference made to FIG. 2 to FIG. 5d.

Figure 2:
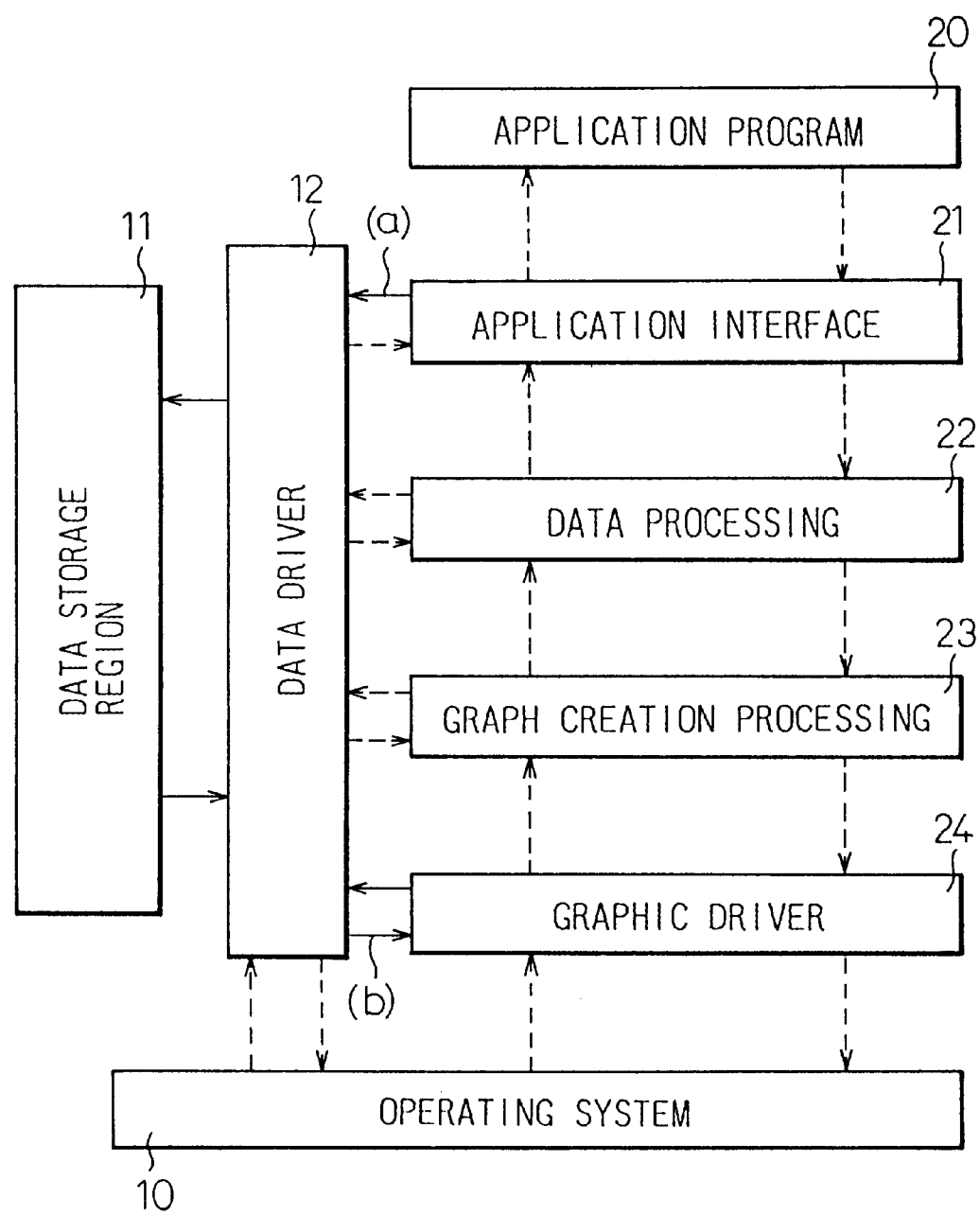
FIG. 2 is a block diagram which shows the configuration of a graph creating system as one embodiment of the present invention.

FIG. 2 is an example of the configuration of a graph creating system as an embodiment of the present invention.

In this drawing, 10 is operating system for the purpose of controlling the execution of each of the programs, 11 is a data storage area used to store data which includes having differing formats, such as numeric and character string, 12 is a data driver which controls the giving and receiving of data between each of the programs to be described below and the data storage area 11, 20 is an application program, and 21 to 24 represents software processing corresponding to programs A to D, these representing respectively the application interface, data processing, graph creation processing, and graphic driver.

It is possible to assign as the data storage area 11 an area in memory (not shown in the drawing) different from that used to store each of the programs, and it is also possible to assign an area within an external memory device having, for example, data files.

In general in graph creation systems, including the one of this embodiment, the program for the purpose of plotting a graph on the device (system) will differ greatly, depending upon not only the device's function and plot generation function, but also on the system environment. For example, in a given system, in plotting a character string, it might be required to give information for the typeface and font family names, and in a different system the character codes may be different. Information with regard to such systems are not required at the data processing section 22, and it is desirable to preform generic (that is, not special) graph creation at the graph creation section 23.

In this embodiment, the application interface section 21 and graphic driver section 24 directly give and receive data with the data storage area via the data driver 12, so that it is possible to use a common interface at the data processing section 22 and graph creation section 23. That is, the passing of data between the application interface section 21 and the graphic driver section 24 does not require a change in the interface between the data processing section 22 and the graph creation section 23.

Figure 3:
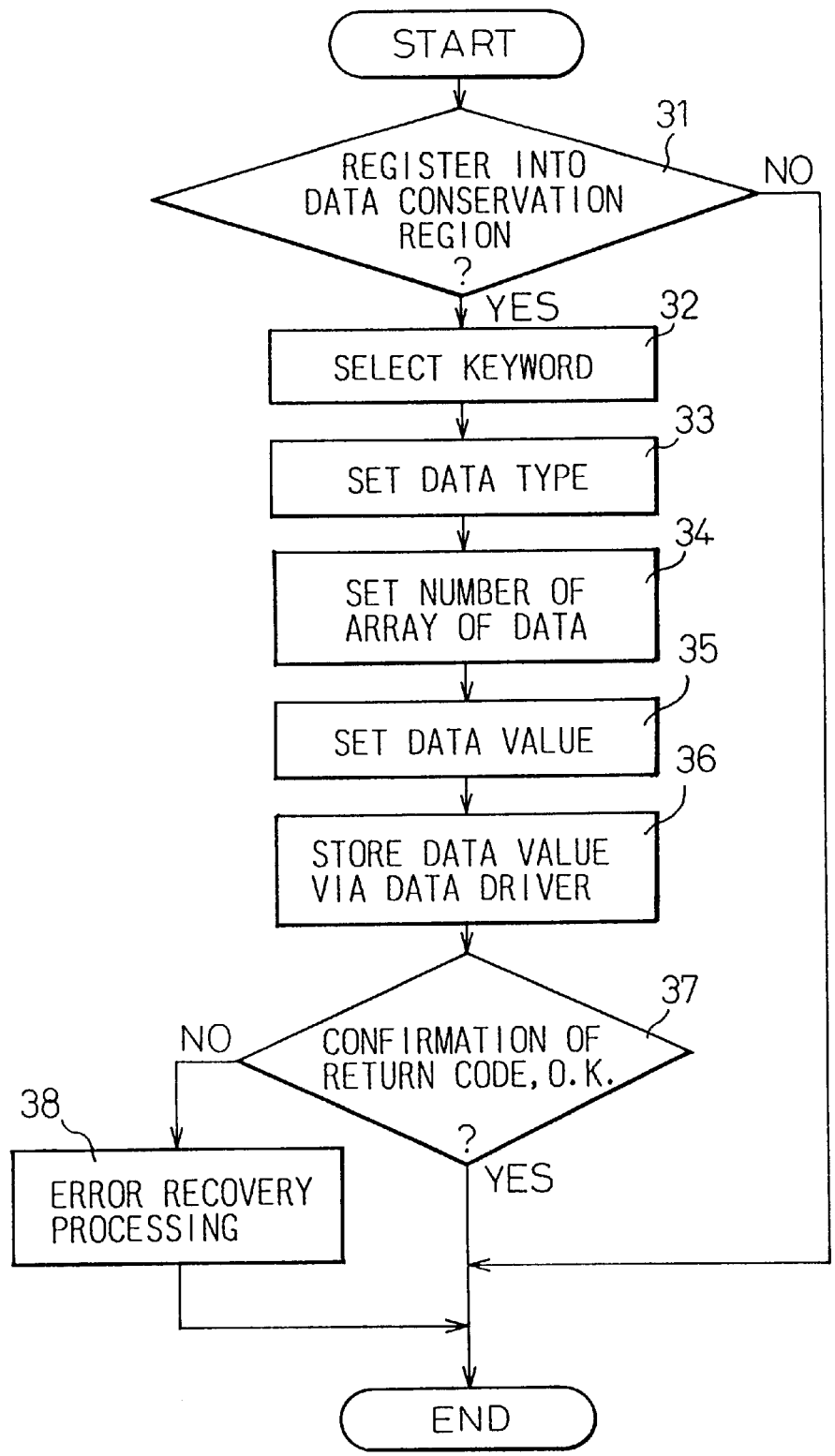
FIG. 3 is a flowchart which shows one example of data storage processing in the system of FIG. 3.

FIG. 3 is a flowchart which shows one example of data storage processing in the system of this embodiment.

First, at step 31 a judgment is made as to whether or not data is to be stored into the data storage area 11, and if the result of this judgment is YES, control proceeds to step 32, whereas if the result is NO, the flow ends. At steps 32, 33, 34, and 35., the keywords of the data to be stored are selected, setting of the data format, the data array size and the data value are performed, and at the next step 36 the data value is stored into the data storage area 11 via the data driver 12. In addition, at step 37, a return code which indicates whether or not the storage of the data value into the data storage area 11 was proper is verified to see if the result is OK (YES) or bad (NO). If the result is Yes, this flow ends. If the result is NO, control proceeds to step 38 where the appropriate error recovery processing is performed, after which the flow ends.

Figure 4:
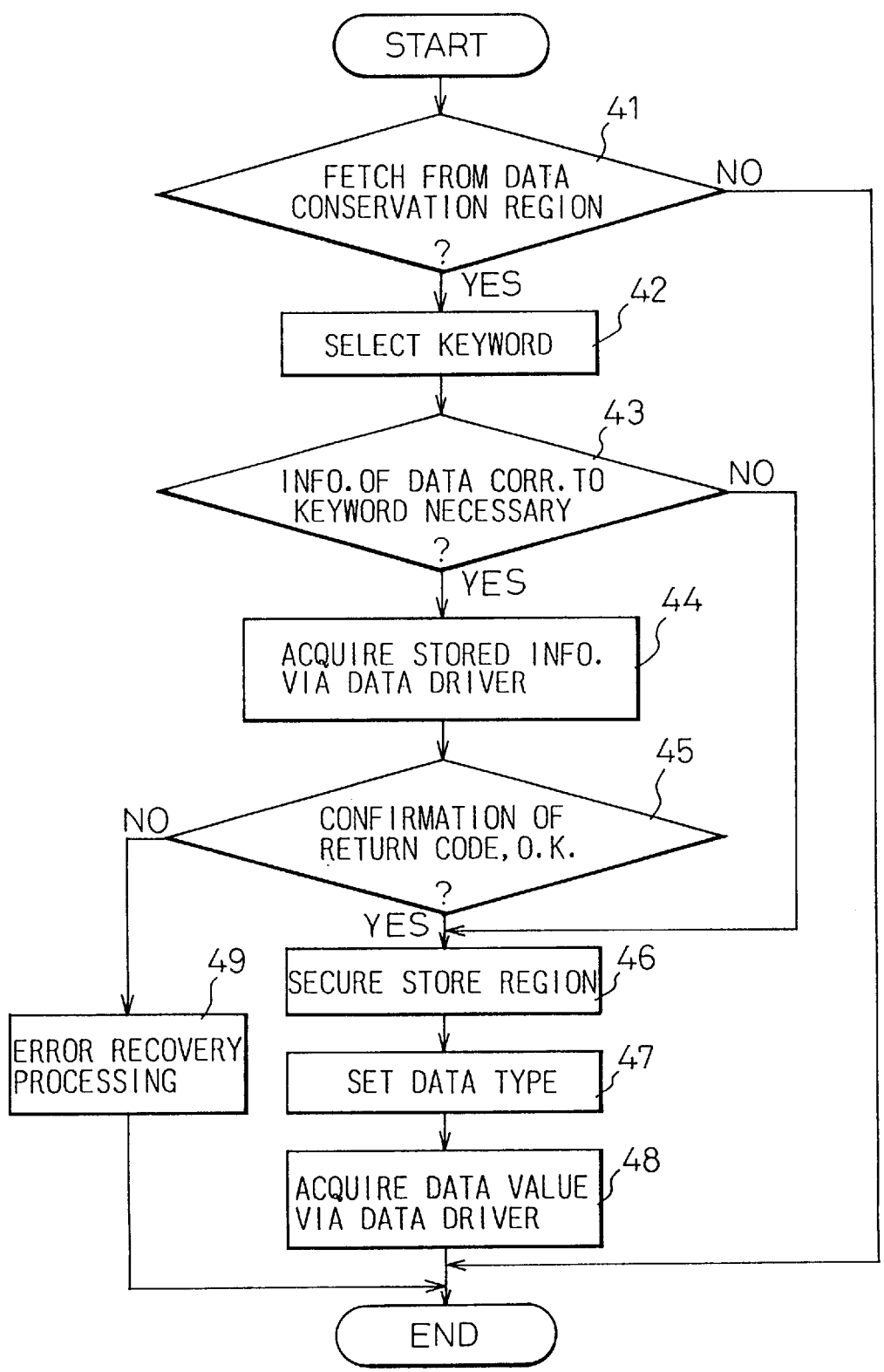
FIG. 4 is a flowchart which shows one example of retrieving data using the system of FIG. 2.

FIG. 4 is a flowchart which shows an example of data retrieval processing in the system of his embodiment.

First, at step 41 a judgment is made as to whether data from the data storage area 11 is to be retrieved (YES) or not (NO). If the result is YES, control proceeds to step 42, and if the result is NO, the flow ends. At step 42, the keywords for the data to be retrieved are selected.

At step 43 a determination is made as to whether information which describes what kind of array there is for the data corresponding to the selected keywords is required (YES) or not required (NO). If the result is YES, control proceeds to step 44, and if the result is no, a jump to step 46 is made. At step 44, information stored in data storage area 11 is retrieved via data driver 12.

At the next step 45, a check is made of the return code which indicates whether retrieval of the data from the data storage area 11 was proper (YES) or not (NO) is made. If the result is YES, execution control proceeds to step 46. If the result is NO, a jump is made to step 49, at which after the corresponding error recovery processing, the flow ends. At step 46, the area for storage of the information retrieved from data storage area 11 is set into the graphic driver 24.

At the next step 47, the format of the data to be retrieved is set, and then at step 48 the value of the data from the application interface 21 which is stored in data storage area 11 is retrieved via the data driver 12. After that, flow is ended.

FIGS. 5a to 5d show a specific example of graph creation using the system of this embodiment.

Figures 5A, 5D:
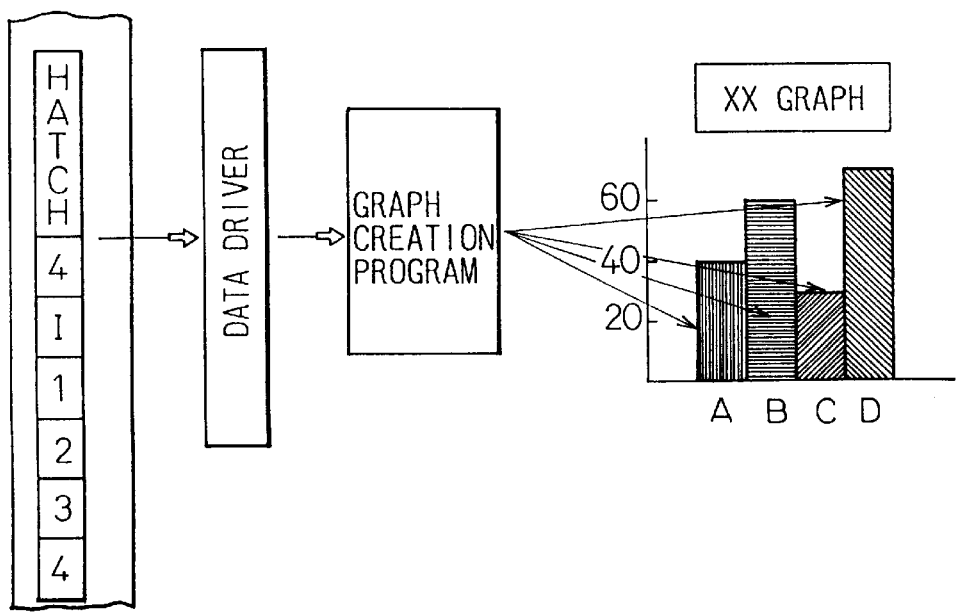

Assume that, as shown in FIG. 5a that there are two systems, system A and system B, in which the hatching line arrangements are different. With respect to system A and system B, in which the hatching line arrangements differ, if the data value arrays are made up, for example, as shown in FIG. 5b and FIG. 5c, in the graph creation program (corresponding to the graph creation processing in FIG. 2), it is possible to display this at all times in the same direction, without considering the difference in hatching line arrangements of system A and system B (refer to FIG. 5d).

As described above, according to this embodiment, when receiving at the graphic driver 24 from the application interface 21, because it is possible to retrieve the required information from the data storage area 11 via the data driver 12, the need to change the interfaces between each of the programs is eliminated.

In addition, because the giving and receiving of data of each of the programs 21 to 24 is controlled via the data driver 12, it is possible for differences between system and platforms to be absorbed by the driver. This eliminates the need to consider the differences between systems or between platforms.

Furthermore, because data is converted to the format specified by the data destination (the graphic driver in the example shown in the drawing), even if the format of the data stored in the data storage area 11 changes, the same information is always obtained by the graphic driver 24 via the data driver 12.

Although the present invention has been disclosed by way of one embodiment, it will be apparent to a person skilled in the art that other embodiments or modifications are possible, without departing from the essential features of the present invention.

What is claimed is:

1. A computer system which operates by means of a plurality of programs and which controls the giving and receiving of data between programs in a memory, said computer system comprising:

a data storage area included in said memory for storing data which include data having a plurality of different data formats (or data types); and a data driver for controlling the storing of data from said plurality of programs into said data storage area and the passing of data from said data storage area to said plurality of programs, wherein, upon receipt of a data-store request which is triggered by a first one of said plurality of programs and which is accompanied by data having its own keyword and its own data format (or data type), said data driver stores said data into said data storage area, the data accompanied by said data-store request including data array size and data value, said data driver dynamically storing data with said data array size and data value into said data storage area, said data driver comprising means for inquiring information with regard to keywords of the data stored in said data storage area, wherein, upon receipt of a data-access request which is triggered by a second one of said plurality of programs and which is accompanied by the same keyword as that of the data stored in said data storage area and a data format (or data type) requested by said second program, said data driver converts the data format (or data type) of said data stored in said data storage area into the requested data format (or data type) and passes the converted data to said second program, and wherein common data interfaces between ones of said plurality of programs other than said first and second programs are left unchanged.

2. A computer system which operates by means of a plurality of programs and which controls the giving and receiving of data between programs in a memory said computer system comprising;

a data storage area included in said memory for storing data which include data having a plurality of different data formats (or data types); and a data driver for controlling the storing of data from said plurality of programs into said data storage area and the passing of data from said data storage area to said plurality of programs.

wherein upon receipt of a data-store request which is triggered by a first one of said plurality of programs and which is accompanied by data having its own keyword and its own data format (or data type), said data driver stores said data into said data storage area. the data accompanied by said data-store request including data array size and data value, and said data driver dynamically storing data with said data array size and data value into said data storage area, said data driver dynamically adding data array size and data value to data having its own keyword and overwriting the added data in said data storage area.

wherein, upon receipt of a data-access request which is triggered by a second one of said plurality of programs and which is accompanied by the same keyword as that of the data stored in said data storage area and a data format (or data type) requested by said second program, said data driver converts the data format (or data type) of said data stored in said data storage area into the requested data format (or data type) and passes the converted data to said other program, and wherein common data interfaces between ones of said plurality of programs other than said first and second programs are left unchanged.

3. A computer system which operates by means of a plurality of programs and which controls the giving and receiving of data between programs in a memory, said computer system comprising:

a data storage area included in said memory for storing data which include data having a plurality of different data formats (or data types); and a data driver for controlling the storing of data from said plurality of programs into said data storage area and the passing of data from said data storage area to said plurality of programs, wherein, upon receipt of a data-store request which is triggered by a first one of said plurality of programs and which is accompanied by data having its own keyword and its own data format (or data type), said data driver stores said data into said data storage area with its data format (or data type), the data accompanied by said data-store request including data array size and data value, said data driver dynamically storing data with said data array size and data value into said data storage area, said data driver comprising means for inquiring information with regard to keywords of the data stored in said data storage area, and wherein, upon receipt of a data-access request which is triggered by a second one of said plurality of programs and which is accompanied by the same keyword as that of the data stored in said data storage area and a data format (or data type) requested by said second program, said data driver converts the data format (or data type) of said data stored in said data storage area into the requested data format (or data type) and passes the converted data to said second program.

4. A computer system which operates by means of a plurality of programs and which controls the giving and receiving of data between programs in a memory, said computer system comprising:

a data storage area included in said memory for storing data which include data having a plurality of different data formats (or data types); and a data driver for controlling the storing of data from said plurality of programs into said data storage area and the passing of data from said data storage area to said plurality of programs, wherein, upon receipt of a data-store request which is triggered by a first one of said plurality of programs and which is accompanied by data having its own keyword and its own data format (or data type), said data driver stores said data into said data storage area with its data format (or data type), the data accompanied by said data-store request including data array size and data value, said data driver dynamically storing data with said data array size and data value into said data storage area, said data driver dynamically adding data array size and data value to data having its own keyword and overwriting the added data in said data storage area, and wherein, upon receipt of a data-access request which is triggered by a second one of said plurality of programs and which is accompanied by the same keyword as that of the data stored in said data storage area and a data format (or data type) requested by said second program, said data driver converts the data format (or data type) of said data stored in said data storage area into the requested data format (or data type) and passes the converted data to said second program.

* * * * *